(12) United States Patent
Liao et al.

(10) Patent No.: US 7,784,693 B2
(45) Date of Patent: Aug. 31, 2010

(54) ASSEMBLY OF SIM CARD AND RFID ANTENNA

(75) Inventors: Dave Liao, Saratoga, CA (US); Steven Donald Edelson, Wayland, MA (US)

(73) Assignee: Silicon Storage Technology, Inc., Sunnyvale, CA (US)

( * ) Notice: Subject to any disclaimer, the term of this patent is extended or adjusted under 35 U.S.C. 154(b) by 654 days.

(21) Appl. No.: 11/797,159

(22) Filed: May 1, 2007

(65) Prior Publication Data

US 2007/0281549 A1 Dec. 6, 2007

Related U.S. Application Data

(60) Provisional application No. 60/810,862, filed on Jun. 5, 2006.

(51) Int. Cl.
*G06K 7/08* (2006.01)

(52) U.S. Cl. .................. 235/451; 235/380; 235/441

(58) Field of Classification Search .................. 235/451, 235/380, 492, 441
See application file for complete search history.

(56) References Cited

U.S. PATENT DOCUMENTS

| 6,161,761 | A | * | 12/2000 | Ghaem et al. | ........... 235/492 |
| 2005/0274803 | A1 | * | 12/2005 | Lee | ............... 235/439 |
| 2006/0175416 | A1 | * | 8/2006 | Ho | ................ 235/492 |
| 2008/0099559 | A1 | * | 5/2008 | Lo et al. | ............ 235/441 |

* cited by examiner

*Primary Examiner*—Edwyn Labaze
(74) *Attorney, Agent, or Firm*—DLA Piper LLP (US)

(57) ABSTRACT

A subscriber identity module (SIM) card includes: a printed circuit board; a circuit provided on the printed circuit board and capable of executing SIM and RFID functions; a set of circuit contacts provided on the printed circuit board, electrically connected to the circuit via conductive paths, and conforming to a SIM specification; a set of antenna contacts provided on the printed circuit board and electrically connected to the circuit via conductive paths; and a protective plate fixed to the printed circuit board and conforming to standard dimensions of the SIM card. An assembly of the SIM card and a RFID antenna is also disclosed.

22 Claims, 4 Drawing Sheets

ASSEMBLY OF SIM CARD AND RFID ANTENNA

CROSS-REFERENCE TO RELATED APPLICATION

This application claims priority of U.S. Provisional Application No. 60/810,862, filed on Jun. 5, 2006.

BACKGROUND OF THE INVENTION

1. Field of the Invention

The invention relates to a subscriber identity module (SIM) card, more particularly to a SIM card that employs a printed circuit board and that has RFID circuits implemented on board.

2. Description of the Related Art

In recent years, handset manufacturers have strived to provide handsets with mobile wallet functionality. For example, in the i-mode mobile wallet proposed by NTT Docomo of Japan, a FeliCa contactless integrated circuit chip is soldered onto a main board of an NTT third generation (3G) handset module to realize the mobile wallet function. Other methods can be used to build the function into the mobile phone, such as using the near field communication (NFC) integrated circuit chip offered by Philips, or the use of an infrared connection port, and have been proposed to achieve the same function. However, the above methods require customers to use new handsets, thereby resulting in lower consumer appeal.

Therefore, in view of practical considerations and to result in lower consumer costs, it has been proposed heretofore to integrate a mobile wallet module into a subscriber identity module (SIM) card, such as the second generation (2G) global system for mobile communication (GSM) SIM card or the 3G universal subscriber identity module (USIM) card. This approach only requires the user to change the SIM card and not the handset. Since the handset is provided with the mobile wallet function by simply installing a new SIM card, better consumer acceptance is possible.

Referring to FIGS. 1 and 2, a conventional SIM card 1 is shown to include a chip 119 mounted on or embedded in a polyvinyl chloride (PVC) plastic card 12. A surface of the plastic card 12 is provided with a metal foil 110 having eight contact pads 111-118 (C1-C8). The SIM card 1 is usually available in two sizes, i.e., an ISO-sized card and a plug-in sized card. The dimensions of an ISO-sized card are generally similar to those of credit cards. On the other hand, a plug-in sized card is generally 25 mm long, 15 mm wide and less than 0.9 mm thick.

When integrating the radio frequency identification (RFID) function of the mobile wallet module into a plug-in sized SIM card 1, there are several technical problems that should be addressed.

First, there is a need to provide an antenna on the SIM card 1. In view of the required length of the antenna, it is usually in the form of a looped or winding pattern. However, because of the small dimensions of the plug-in sized SIM card 1, not enough space is available to accommodate an effective RFID antenna. Therefore, to solve this problem, a coil antenna is installed on a back casing of the handset, and two antenna signal feed points on the handset main board are electrically connected to the C4 contact pad 114 and the C8 contact pad 118 of the SIM card 1. Alternatively, the coil antenna may be formed on a flexible printed circuit (FPC) board, and the FPC board antenna is subsequently connected to the SIM card 1. However, according to the ISO-7816-12 specification, the C4 contact pad 114 and the C8 contact pad 118 are allocated for electrical connection to a universal serial bus (USB) port. In addition, most handsets currently available on the market are not built with contacts for electrical connection with the C4 contact pad 114 and the C8 contact pad 118. As a result, connection of the antenna to the C4 contact pad 114 and the C8 contact pad 118 is impractical at this time. Furthermore, the conventional SIM card 1 with the PVC plastic card 12 is not suited for fixing a FPC board thereon. While it is possible to mount directly the FPC board on the C4 contact pad 114 and the C8 contact pad 118 at the top surface of the SIM card 1, the mounting process is prone to errors. In addition, when mounting the FPC boar don the SIM card 1, not only is it not possible to automate the mounting process, automated testing is not possible as well.

SUMMARY OF THE INVENTION

Therefore, one object of the present invention is to provide a SIM card that uses a printed circuit board instead of a metal foil to facilitate expansion of functions thereof.

Another object of the present invention is to provide a SIM card with RFID functionality so as to be suitable for mobile wallet applications.

According to one aspect of the present invention, a SIM card includes: a printed circuit board; a circuit provided on the printed circuit board and capable of executing SIM and RFID functions; a set of circuit contacts provided on the printed circuit board, electrically connected to the circuit via conductive paths, and conforming to a SIM specification; a set of antenna contacts provided on the printed circuit board and electrically connected to the circuit via conductive paths; and a protective plate fixed to the printed circuit board and conforming to standard dimensions of the SIM card.

Preferably, the printed circuit board has a first surface and a second surface opposite to the first surface. One of the first and second surfaces is provided with the circuit contacts that conform to the SIM specification and that are electrically connected to the circuit. The antenna contacts are provided on the other one of the first and second surfaces.

Preferably, the circuit is provided on the printed circuit board using chip-on-board techniques, and is covered by the protective plate.

According to another aspect of the present invention, an assembly includes a SIM card and a RFID antenna. The SIM card includes: a printed circuit board; a circuit provided on the printed circuit board and capable of executing SIM and RFID functions; a set of circuit contacts provided on the printed circuit board, electrically connected to the circuit via conductive paths, and conforming to a SIM specification; and a set of antenna contacts provided on the printed circuit board and electrically connected to the circuit via conductive paths. The RFID antenna is connected electrically to the antenna contacts.

In one embodiment, each of the antenna contacts is connected electrically to matching contacts of the RFID antenna via conductive paste.

In the present invention, a printed circuit board is used to replace the metal foil employed in the prior art. Since the printed circuit board can be formed with highly precise and complex conductive paths, it is suitable for electrical connection with different chips or for addition of antenna contacts for expanded functionality. As a result, the RFID antenna can be electrically connected to the added antenna contacts to achieve the RFID function so as to be suitable for mobile wallet applications. The printed circuit board makes it easy to add a compensation capacitor to the RFID antenna. This technique greatly enhances RFID reading performance.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
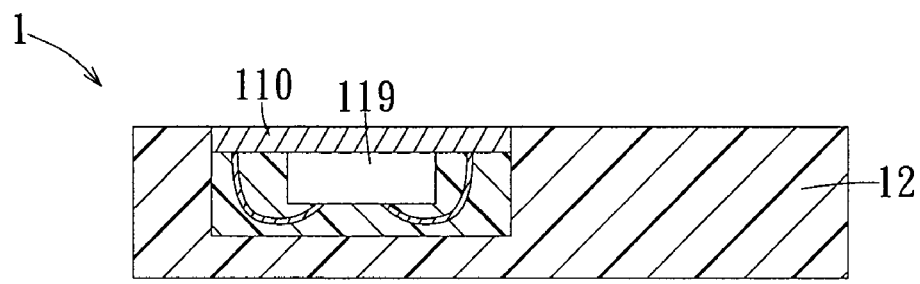
FIG. 1 is a sectional view of a conventional SIM card.
Figure 2:
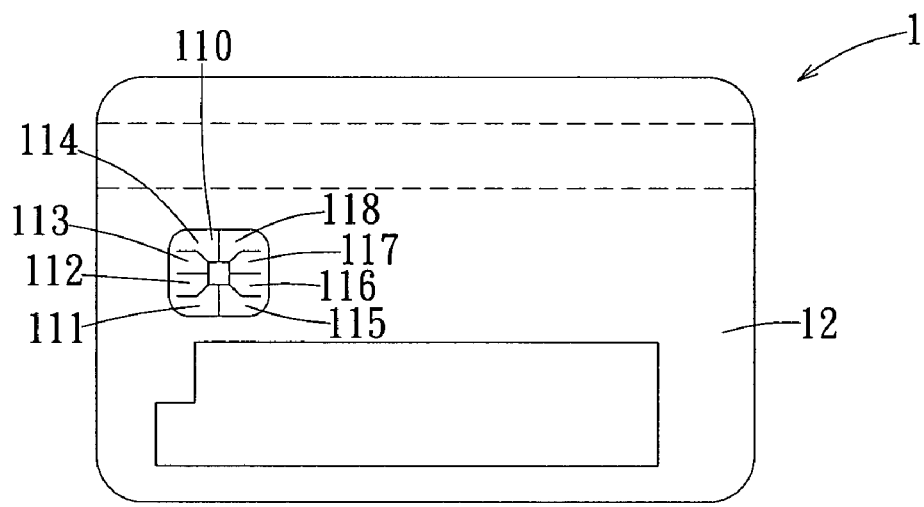
FIG. 2 is a schematic view to illustrate eight contact pads of the conventional SIM card.
Figure 3:
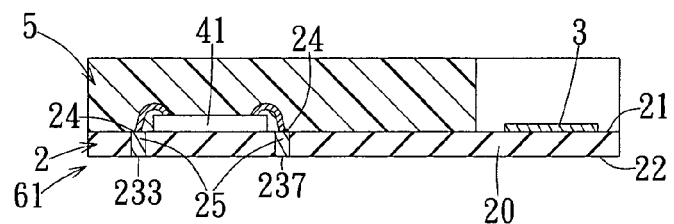
FIG. 3 is a sectional view of the preferred embodiment of a SIM card according to the present invention.
Figure 4:
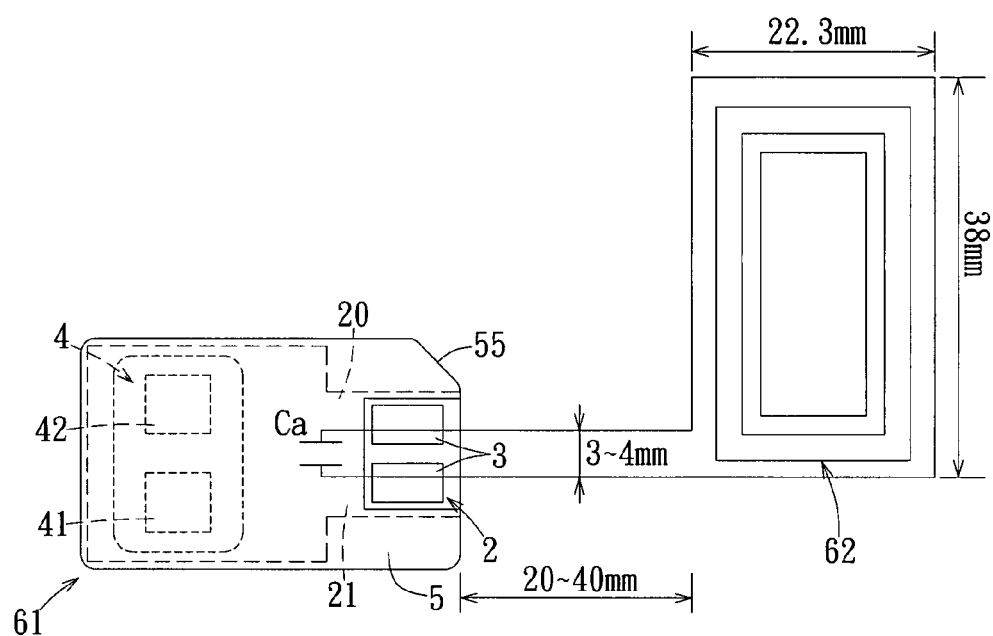
FIG. 4 is a schematic view to illustrate an integrated circuit, antenna contacts, a RFID antenna and a compensation capacitor of the preferred embodiment.
Figure 5:
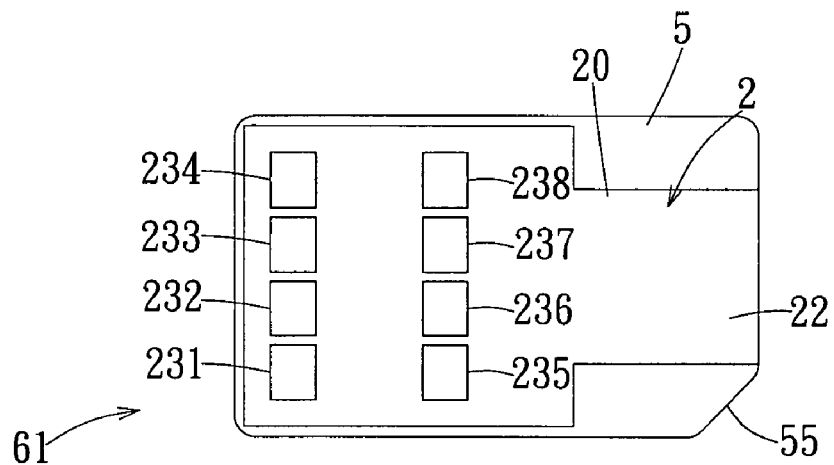
FIG. 5 is a schematic view to illustrate eight circuit contacts conforming to a SIM specification of the preferred embodiment.

Referring to FIGS. 3, 4 and 5, the preferred embodiment of a SIM card 61 according to the present invention is shown to include a printed circuit board (PCB) 2, a set of antenna contacts 3, an integrated circuit 4, and a protective plate 5. Integrated circuit 4 can be a traditional, single, monolithic IC, or may be implemented as a connected collection of ICs or other circuit elements.

The PCB 2 has a board body 20 with a first surface 21 and a second surface 22 opposite to the first surface 21. The second surface 22 is provided with a set of circuit contacts 231-238 (C1-C8) conforming to a SIM specification. Contact pads 24 are provided on the first surface 21. Some of the contact pads 24 are each connected to a respective one of the circuit contacts 231-238 via a corresponding conductive path 25. The antenna contacts 3 are provided on the first surface 21 and are each connected to a corresponding one of the contact pads 24 via a corresponding conductive path. It should be noted herein that the circuit contacts 231-238 conforming to the SIM specification and the antenna contacts 3 may be provided on the same surface of the board body 20 in other embodiments of this invention. In this embodiment, there are eight of the circuit contacts 231-238 and two of the antenna contacts 3. In addition, one end portion of the board body 20 adjacent to the antenna contacts 3 is indented inwardly at two lateral edges thereof, thereby configuring the board body 20 with wider and narrower end portions. However, in other embodiments of this invention, the board body may have a shape corresponding to that of a plug-in sized SIM card, and may be formed with a cut corner to guide proper insertion of the PCB into an electrical connector.

The integrated circuit 4 is provided on the PCB 2 but may be replaced by other circuits with the same functionality. The integrated circuit 4 includes a subscriber identity chip 41 and a RFID chip 42. The two chips 41, 42 are provided on the first surface 21 of the board body 20 using chip-on-board (COB) techniques, and are connected electrically to the contact pads 24 using bonding wires.

In the present invention, the PCB 2 is used to replace the metal foil employed in the prior art. Since the PCB 2 can be formed with highly precise and complex conductive paths 25, it is suitable for electrical connection with different chips or for addition of the antenna contacts 3 to expand functionality. In addition, since the antenna contacts 3 can be made larger than the circuit contacts 231-238 conforming to the SIM specification, connection to a RFID antenna can be facilitated. In other words, it is not necessary to use two of the circuit contacts 231-238 conforming to the SIM specification for connection to the RFID antenna. Therefore, assuming that the eight circuit contacts 231-238 conform to the ISO-7816-12 specification, two of the circuit contacts 234, 238 (C4, C8) could be used for electrical connection to a universal serial bus (USB) port.

The protective plate 5 is made of plastic and has a shape corresponding to that of a plug-in sized SIM card. The dimensions of the protective plate 5 conform to standard dimensions of the SIM card 61. The protective plate 5 has a cut corner 55 to guide proper insertion into an electrical connector. The protective plate 5 is mounted on the first surface 21 of the board body 20 to cover the chips 41, 42 while exposing the antenna contacts 3. The protective plate 5 is mounted on the PCB 2 by applying adhesive to the first surface 21 of the board body 20. When the SIM card 61 is installed in a mobile communications device, such as a GSM handset or a Personal Handy phone System (PHS) handset, it can provide the mobile communications device with basic functions of a conventional handset, such as call making, storage of phone numbers, etc.

Figure 6:
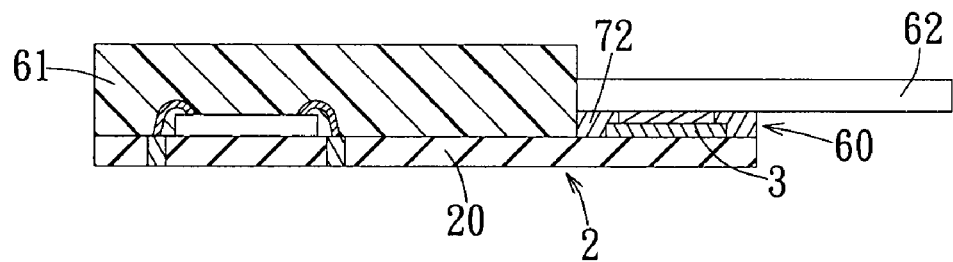
FIG. 6 is a sectional view to illustrate an assembly of the SIM card of the preferred embodiment and a RFID antenna.

Referring to FIG. 6, when it is desired to use a mobile wallet function that is integrated into the SIM card 61, it is required to use an assembly 60 of the SIM card 61 and a RFID antenna 62. First, the RFID antenna 62 that includes a flexible printed circuit board is mounted on the PCB 2 and is electrically connected to the antenna contacts 3. The assembly 60 of the SIM card 61 and the RFID antenna 62 is then installed in the casing of a mobile communications device such that the circuit contacts 231-238 (see FIG. 5) are connected to a main board in the casing, thereby enabling the mobile communications device to execute mobile wallet functions.

Two methods are available for mounting of the RFID antenna 62. In the first method, solder material 72 is employed to fix the RFID antenna 62 to the antenna contacts 3. In the second method, a conductive paste is applied to the contacts of the RFID antenna 62 and/or the antenna contacts 3, followed by a heat-pressing operation to bond adhesively the RFID antenna 62 to the antenna contacts 3.

Referring to FIG. 4, key design parameters of the RFID antenna 62 is disclosed, such as the size of the antenna coil pattern. A size of 22.3 mm by 38 mm is chosen so that the RFID antenna 62 can fit into most mobile handsets that commonly have an area of 25 mm by 40 mm above battery, which is sufficient to accommodate the RFID antenna 62. This is much smaller than the antenna used in typical RFID cards. A smaller antenna size results in sub-optimal RFID reading performance. A key technique deployed in this invention is to place a compensation capacitor (Ca) on the PCB 2. In this embodiment, the compensation capacitor (Ca) is a 22 pF capacitor connected across the two antenna contacts 3. Optimal RFID reading parameters of 15 MHz resonant frequency and Q factor of 35 are achieved with eight turns of the antenna coil pattern. In the manufacture of commonly used RFID or contactless smart card, no capacitor is used because it is very difficult to add one into the plastic card. Therefore, the ability to add the compensation capacitor (Ca) is another major advantage of this invention.

Figure 7:
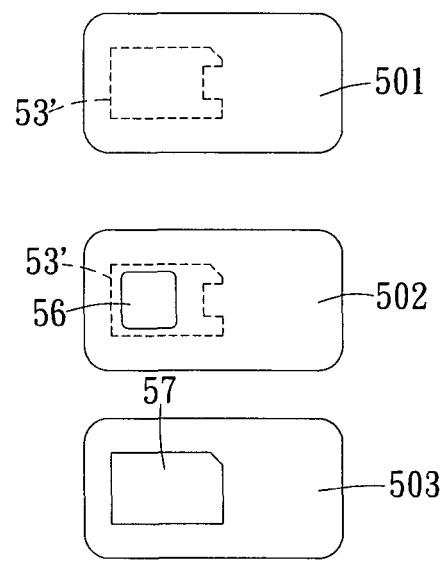
FIG. 7 is an exploded view to illustrate the manufacture of the SIM card of the preferred embodiment.
Figure 8:
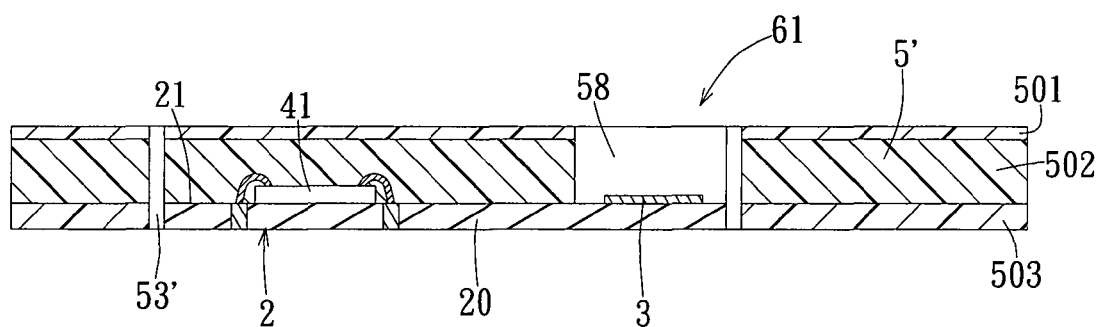
FIG. 8 is a sectional view to illustrate relative positions of plate bodies used in the manufacture of the SIM card of the preferred embodiment.

Referring to FIGS. 7 and 8, in the manufacture of the SIM card 61, a first plate body 501, a second plate body 502, and a third plate body 503 are arranged in a stack to form a protective plate 5'. The protective plate 5' is a 0.8 mm-thick plastic card having dimensions corresponding to those of a standard credit card and larger than those of the PCB 2. The protective plate 5' is configured with a protective region corresponding to the PCB 2 in dimensions and to be disposed above the PCB 2. Each of the first and second plate bodies 501, 502 is formed with a closed tear line 53' that surrounds the protective region. The first and second plate bodies 501, 502 are further formed with aligned access holes 58 for exposing the antenna contacts 3 on the PCB 2. The second plate body 502 is further formed with a chip receiving space 56 in the protective region for receiving the chips 41, 42 (see FIG. 4). The third plate body 503 is formed with a board receiving hole 57 for receiving the PCB 2. After the plate bodies 501, 502, 503 are bonded together in a stack, the tear lines 53' in the plate bodies 501, 502 are superimposed one above the other, and the chip receiving space 56 is in spatial communication with the board receiving hole 57.

Subsequently, the PCB 2 provided with the antenna contacts 3 and the integrated circuit 4 (see FIG. 4) is mounted adhesively to the protective plate 5' such that the chips 41, 42 are received in the chip receiving space 56, such that the board body 20 of the PCB 2 is disposed in the board receiving hole 57, and such that the antenna contacts 3 are exposed by the access holes 58 in the first and second plate bodies 501, 502. In use, the protective plate 5' is torn at the tear lines 53' to result in the SIM card 61 shown in FIG. 3. The RFID antenna 62 is then mounted on the SIM card 61 if required, and the SIM card 61 is installed in a mobile communications device to permit use of the latter.

In this embodiment, each of the plate bodies 501, 502, 503 is made from polyethylene terephthalate (PET) having a melting point of 120° C. The plate bodies 501, 502, 503 are bonded together by heating at a temperature of more than 100° C. However, other plastic materials capable of withstanding high temperatures may be used for the plate bodies 501, 502, 503.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A subscriber identity module (SIM) card comprising:
   a printed circuit board, having a first surface and a second surface opposite to said first surface;
   a circuit provided on said printed circuit board and capable of executing SIM and radio frequency identification (RFID) functions, said circuit provided on one of said first and second surfaces of said printed circuit board;
   a set of circuit contacts provided on said printed circuit board, electrically connected to said circuit via conductive paths, and conforming to a SIM specification, said circuit contacts being provided on the other one of said first and second surfaces of said printed circuit board; and
   a set of antenna contacts provided on said printed circuit board and electrically connected to said circuit via conductive paths, said antenna contacts being provided on said one of said first and second surfaces of said printed circuit board.

2. The SIM card as claimed in claim 1, wherein said circuit is an integrated circuit that includes a subscriber identity module and a RFID module, each of said subscriber identity module and said RFID module being implemented as one of an independent chip and a function module within a chip.

3. The SIM card as claimed in claim 2, further comprising a capacitor connected to said antenna contacts.

4. The SIM card as claimed in claim 3, wherein said circuit and said antenna contacts are provided on said first surface of said printed circuit board, said circuit contacts being provided on said second surface of said printed circuit board, said printed circuit board further having a plurality of contact pads provided on said first surface, each of said conductive paths connecting a respective one of said contact pads to a respective one of said circuit contacts and said antenna contacts, said subscriber identity module and said RFID module being electrically connected to corresponding ones of said contact pads.

5. The SIM card as claimed in claim 4, further comprising a protective plate fixed to said first surface of said printed circuit board to cover said circuit while exposing said antenna contacts.

6. The SIM card as claimed in claim 5, wherein said protective plate has dimensions conforming to standard dimensions of a SIM card.

7. The SIM card as claimed in claim 5, wherein said protective plate has dimensions larger than those of said printed circuit board, said protective plate being configured with a protective region corresponding to said printed circuit board in dimensions and to be disposed above said printed circuit board, said protective plate being formed with a tear line surrounding said protective region.

8. The SIM card as claimed in claim 7, wherein said protective plate includes a first plate body, a second plate body and a third plate body arranged in a stack, said tear line being formed in said first and second plate bodies to surround said protective region, said first and second plate bodies being further formed with aligned access holes for exposing said antenna contacts, said second plate body being further formed with a chip receiving space for receiving said circuit, said third plate body being formed with a board receiving hole for receiving said printed circuit board.

9. The SIM card as claimed in claim 8, wherein said protective plate is made of a plastic material.

10. The SIM card as claimed in claim 9, wherein the plastic material is polyethylene terephthalate.

11. The SIM card as claimed in claim 1, comprising eight of said circuit contacts and two of said antenna contacts.

12. The SIM card as claimed in claim 11, wherein two of said circuit contacts are adapted for electrical connection to a USB port.

13. An assembly of a subscriber identity module (SIM) card and a radio frequency identification (RFID) antenna, comprising:
   a SIM card including
      a printed circuit board having a first surface and a second surface opposite to said first surface,
      a circuit provided on said printed circuit board and capable of executing SIM and RFID functions, said circuit being provided on one of said first and second surfaces of said printed circuit board,
      a set of circuit contacts provided on said printed circuit board, electrically connected to said circuit via conductive paths, and conforming to a SIM specification, said circuit contacts being provided on the other one of said first and second surfaces of said printed circuit board, and
      a set of antenna contacts provided on said printed circuit board and electrically connected to said circuit via conductive paths, said antenna contacts provided on said one of said first and second surfaces of said printed circuit board; and a RFID antenna electrically connected to said antenna contacts on said printed circuit board.

14. The assembly as claimed in claim 13, wherein said RFID antenna includes a flexible printed circuit board.

15. The assembly as claimed in claim 13, further comprising solder material for fixing said RFID antenna to said antenna contacts.

16. The assembly as claimed in claim 13, further comprising conductive paste for fixing said RFID antenna to said antenna contacts.

17. The assembly as claimed in claim 13, wherein said circuit is an integrated circuit.

18. The assembly as claimed in claim 17, wherein said integrated circuit includes a subscriber identity chip and a RFID chip.

19. The assembly as claimed in claim 18, wherein said circuit and said antenna contacts are provided on said first surface of said printed circuit board, said circuit contacts being provided on said second surface of said printed circuit board, said printed circuit board further having a plurality of contact pads provided on said first surface, each of said conductive paths connecting a respective one of said contact pads to a respective one of said circuit contacts and said antenna contacts, said subscriber identity chip and said RFID chip being electrically connected to corresponding ones of said contact pads.

20. The assembly as claimed in claim 19, further comprising a protective plate fixed to said first surface of said printed circuit board to cover said circuit while exposing said antenna contacts.

21. The assembly as claimed in claim 20, wherein said protective plate is made of a plastic material.

22. The assembly as claimed in claim 13, wherein said SIM card includes eight of said circuit contacts and two of said antenna contacts.

* * * * *